(12) United States Patent
Liao et al.

(10) Patent No.: US 8,842,946 B1
(45) Date of Patent: Sep. 23, 2014

(54) LIGHT SENSOR HAVING REDUCED DARK CURRENT

(75) Inventors: Shirong Liao, Mira Loma, CA (US); Cheng-Chih Kung, San Gabriel, CA (US); Dazeng Feng, El Monte, CA (US); Ning-Ning Feng, Arcadia, CA (US); Yong Liu, Fountain Valley, CA (US); Roshanak Shafiiha, La Canada-Flintridge, CA (US)

(73) Assignee: Kotura, Inc., Montery Park, CA (US)

( * ) Notice: Subject to any disclaimer, the term of this patent is extended or adjusted under 35 U.S.C. 154(b) by 310 days.

(21) Appl. No.: 13/506,071

(22) Filed: Mar. 26, 2012

Related U.S. Application Data (63) Continuation of application No. 13/065,963, filed on Apr. 1, 2011, now abandoned.

(51) Int. Cl.
*G02B 6/12* (2006.01)

(52) U.S. Cl.
USPC ............................................................ 385/14

(58) Field of Classification Search
None
See application file for complete search history.

(56) References Cited

U.S. PATENT DOCUMENTS

| | | | | |
|---|---|---|---|---|
| 4,470,875 | A | * | 9/1984 | Poteat ........................... 438/701 |
| 4,762,382 | A | * | 8/1988 | Husain et al. ................. 385/132 |
| 7,432,558 | B1 | * | 10/2008 | Ahmed et al. ................. 257/368 |
| 2002/0045030 | A1 | * | 4/2002 | Ozin et al. ..................... 428/173 |
| 2008/0073744 | A1 | * | 3/2008 | Masini et al. ................. 257/466 |
| 2009/0152596 | A1 | * | 6/2009 | Yang et al. ..................... 257/253 |
| 2010/0074577 | A1 | * | 3/2010 | Yang et al. ..................... 385/17 |
| 2014/0003766 | A1 | * | 1/2014 | Heck et al. ..................... 385/14 |

* cited by examiner

*Primary Examiner* — Mike Stahl (74) *Attorney, Agent, or Firm* — Gavrilovich, Dodd & Lindsey, LLP (57) ABSTRACT

The light sensor is included on an optical device having a waveguide on a base. The waveguide is configured to guide a light signal through a crystalline light-transmitting medium. The light sensor is also positioned on the base and is configured to receive the light signal from the waveguide. The light sensor includes a planar interface between two different materials. The interface is at a 45° angle relative to a <110> direction of the light-transmitting medium.

20 Claims, 7 Drawing Sheets

LIGHT SENSOR HAVING REDUCED DARK CURRENT

RELATED APPLICATIONS

This application a continuation of U.S. patent application Ser. No. 13/065,963, filed on Apr. 1, 2011, entitled "Light Sensor Having Reduced Dark Current," and incorporated herein in its entirety. This application is related to U.S. patent application Ser. No. 12/380,016, filed on Feb. 19, 2009, entitled "Optical Device Having Light Sensor Employing Horizontal Electrical Field, and also to U.S. patent application Ser. No. 12/589,501, filed on Oct. 23, 2009, entitled "System Having Light Sensor with Enhanced Sensitivity," each of which is incorporated herein in its entirety.

FIELD

The present invention relates to optical devices and more particularly to devices having a light sensor.

BACKGROUND

The use of optical and/or optoelectronic devices is increasing in communications applications. These devices can include light sensors that receive light signals from a waveguide. In one version of these light sensors, an electrical field is applied across the light sensor. An electrical current flows through the light sensor in response to the light sensor receiving photons of light. The level of the electrical current through the light sensor indicates the presence and/or amount of light received by the light sensor.

One of the challenges associated with these types of light sensors is dark current. Dark current refers to a small amount of electrical current flowing through the light sensor even though the light sensors is not receiving photons. There is a need for light sensors having a reduced level of dark current.

SUMMARY

The optical device includes a waveguide on a base. The waveguide is configured to guide a light signal through a crystalline light-transmitting medium. The waveguide guides the light signal to a light sensor that is also positioned on the base. The light sensor is configured to receive the light signal from the waveguide. The light sensor includes a planar interface between two different materials. The interface is at a 45° angle relative to a <110> direction of the light-transmitting medium.

Methods of forming the device are also disclosed. In some instances, the method includes forming a surface of the interface. In some instances, forming the surface includes performing a wet etch of the device.

BRIEF DESCRIPTION OF THE FIGURES

FIG. 1A through FIG. 1D illustrate an optical device having a light sensor configured to receive light signals from a waveguide.

FIG. 3A through FIG. 9E illustrate a method of generating an optical device constructed according to FIG. 1A through FIG. 1D.

DESCRIPTION

The optical device includes a light-transmitting medium on a base. The device also includes a waveguide configured to guide a light signal through the light-transmitting medium. The optical device also includes a light sensor. The light sensor includes a ridge extending from slab regions positioned on opposing sides of the ridge. The ridge includes a multiplication layer and an absorption layer. The absorption layer is positioned to receive at least a portion of the light signal from the waveguide. Additionally, the absorption layer generates a hole and electron pair in response to receiving a photon of the light signal. The multiplication layer is positioned to receive the electron generated in the absorption layer and to generate additional electrons in response to receiving the electron. This ability of the light sensor to generate multiple electrons in response to the receipt of a single photon enhances the sensitivity of the light sensor.

The light sensor includes an interface between a light-transmitting medium such as silicon and a light-absorbing medium such as germanium. It turns out that defects at this interface are a source of dark current. The inventors believe these defects are often a result of using a dry etch, such as plasma etch, to form one of the surface of the interface. A dry etch can introduce surface damage due to bombardment by high energy ions and the presence of reactive species in the plasma. Surface damage includes surface residue, impurity penetration and lattice damage. These characteristics are believed to be the source of the defects that cause dark current. In contrast, wet etching reduces these characteristics and accordingly reduces the defects that are the source of dark current. As a result, using a wet etch to form one of the interface surfaces reduces the dark current of the light sensor.

Figure 1A:
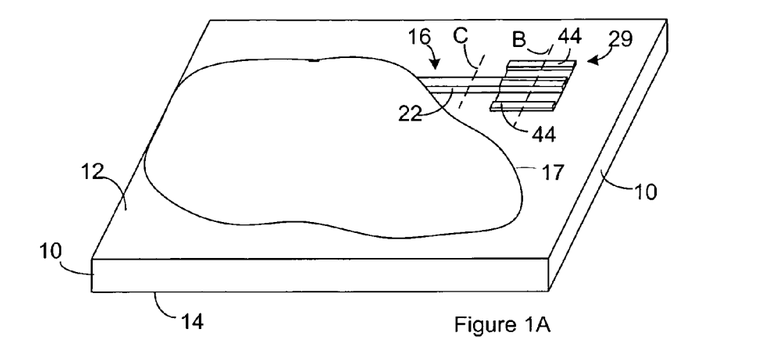
FIG. 1A is a perspective view of the device.
Figure 1B:
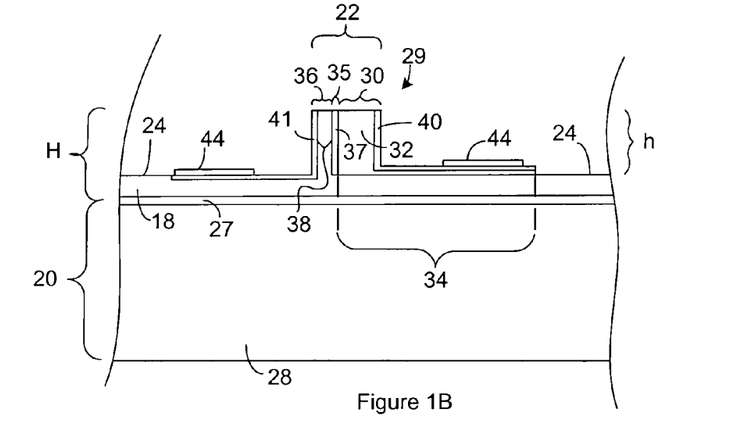
FIG. 1B is a cross-section of the device shown in FIG. 1A taken along the line labeled B.
Figure 1C:
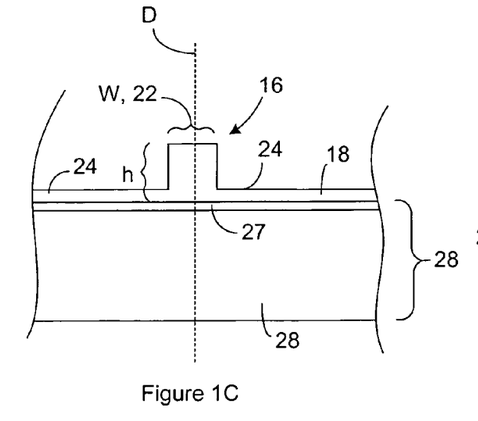
FIG. 1C is a cross-section of the device shown in FIG. 1A taken along the line labeled C.
Figure 1D:
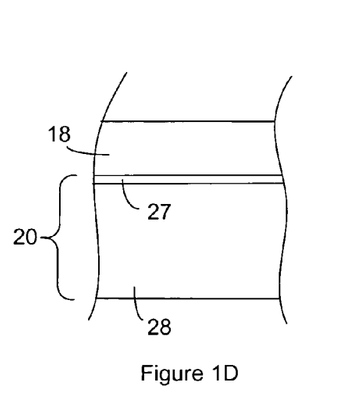
FIG. 1D is a cross-section of the optical device shown in FIG. 1C taken along the line labeled C and extending parallel to the longitudinal axis of the waveguide.

FIG. 1A through FIG. 1D illustrate an optical device having a light sensor configured to receive light signals from a waveguide. FIG. 1A is a perspective view of the device. FIG. 1B is a cross-section of the light sensor. For instance, FIG. 1B is a cross-section of the device shown in FIG. 1A taken along the line labeled B. FIG. 1C is a cross-section of the waveguide. For instance, FIG. 1C is a cross-section of the device shown in FIG. 1A taken along the line labeled C. FIG. 1D is a cross-section of the optical device shown in FIG. 1C taken along the line labeled C and extending parallel to the longitudinal axis of the waveguide.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a light-transmitting medium 18 positioned on a base 20. For instance, the waveguide 16 is partially defined by a ridge 22 extending upward from slab regions of the light-transmitting medium 18. In some instances, the top of the slab regions are defined by the bottom of trenches 24 extending partially into the light-transmitting medium 18 or through the light-transmitting medium 18. Suitable light-transmitting media 18 include, but are not limited to, silicon, polymers, silica, SiN, GaAs, InP and LiNbO$_3$. One or more cladding layers are optionally positioned on the light-transmitting medium 18. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and LiNbO$_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 27 with a lower index of refraction than the light-transmitting medium 18. The drop in the index of refraction can cause reflection of a light signal from the light-transmitting medium 18 back into the light-transmitting medium 18. The base 20 can include the optical insulator 27 positioned on a substrate 28. As will become evident below, the substrate 28 can be configured to transmit light signals. For instance, the substrate 28 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 27 and the silicon substrate can serve as the substrate 28.

The optical device also includes a light sensor 29 configured to receive a light signal guided by the one or more waveguides 16. The light sensor 29 is configured to convert the light signal to an electrical signal. Accordingly, the light sensor can be employed to detect receipt of light signals. For instance, the light sensor 29 can be employed to measure the intensity of a light signal and/or power of a light signal. Although FIG. 1A illustrates a waveguide 16 carrying the light signal between the one or more components and the light sensor 29, the device can be constructed such that the waveguide 16 carries the light signal directly from an optical fiber to the light sensor 29.

The light sensor 29 includes a ridge 22 extending from slab regions positioned on opposing sides of the ridge 22. The tops of the slab regions are defined by the bottom of trenches 24 on opposing sides of the ridge 22. The ridge 22 includes an absorption layer 30. For instance, FIG. 1B shows a light-absorbing medium 32 that absorbs light signals serving as the absorption layer 30. Suitable light-absorbing media include media that upon being exposed to an electrical field, produce an electron and hole pair in response to receiving a photon. Examples of light-absorbing media 32 that are suitable for detection of light signals in at the wavelengths commonly employed in communications applications includes, but are not limited to, germanium, silicon germanium, silicon germanium quantum well, GaAs, and InP. Germanium is suitable for detection of light signals having wavelengths in a range of 1300 nm to 1600 nm.

The absorption layer 30 can be positioned on a seed portion 34 of the light-transmitting medium 18. In particular, the light-absorbing medium 32 of the light sensor 29 can be positioned on a seed portion 34 of the light-transmitting medium 18. The seed portion 34 of the light-transmitting medium 18 is positioned on the base 20. In particular, the seed portion 34 of the light-transmitting medium 18 contacts the insulator 27. The seed portion 34 of the light-transmitting medium 18 can be continuous with the light-transmitting medium 18 included in the waveguide 16 or spaced apart from the waveguide 16. When the light signal enters the light sensor, a portion of the light signal can enter the seed portion 34 of the light-transmitting medium 18 and another portion of the light signal enters the light-absorbing medium 32. Accordingly, the light-absorbing medium 32 can receive only a portion of the light signal. In some instances, the light sensor can be configured such that the light-absorbing medium 32 receives the entire light signal.

As will become evident below, during the fabrication of the device, the seed portion 34 of the light-transmitting medium 18 can be used to grow the light-absorbing medium 32. For instance, when the light-transmitting medium 18 is silicon and the light-absorbing medium 32 is germanium, the germanium can be grown on the silicon. As a result, the use of the light-transmitting medium 18 in both the waveguides 16 and as a seed layer for growth of the light-absorbing medium 32 can simplify the process for fabricating the device.

The light sensor also includes a charge layer 35 between a multiplication layer 36 and the absorption layer 30. At least a portion of the multiplication layer 36 is positioned such that the absorption layer 30 is not located between the portion of the multiplication layer 36 and the base 20. For instance, the portion of the multiplication layer 36 can contact the base 20. In some instances, the multiplication layer 36 is positioned such that none of the absorption layer 30 is between the base 20 and the multiplication layer 36. As a result, the multiplication layer 36 and the absorption layer 30 can be positioned adjacent to one another on the base 20. Further, the multiplication layer 36 and the absorption layer 30 can be positioned adjacent to one another such that a line that is parallel to the top and/or bottom of the base 20 extends through both the multiplication layer 36 and the absorption layer 30.

Although the multiplication layer 36 is shown as a single layer of material, the multiplication layer 36 can include multiple layers of material. Suitable materials for the multiplication layer 36 include, but are not limited to, materials that upon being exposed to an electrical field and receiving an electron can excite additional electronics. Examples include, but are not limited to, semiconductor materials including crystalline semiconductors such as silicon. As a result, in some instances, the light-transmitting medium 18 and the multiplication layer 36 can be the same material. In FIG. 7B, the light-transmitting medium 18 and the multiplication layer 36 are shown as the same material.

In some instances, the material in which the multiplication layer 36 is formed includes a doped region 37 that serves as the charge layer 35. In addition, the material in which the multiplication layer 36 is formed can also include an undoped region 38 positioned such that the doped region 37 is between the undoped region 38 and the absorption layer 30. The doped region 37 can be an N-type doped region or a P-type doped region. In one example, the material for the multiplication layer 36 is a layer of silicon and that layer of silicon includes a doped region 37 doped with a p-type dopant and that doped region 37 is in contact with the absorption layer 30 as shown in FIG. 1B.

The light-absorbing medium 32 or the absorption layer 30 can include a first doped region 40 that serves as a field source for the electrical field to be formed in the ridge 22. For instance, FIG. 1B illustrates the light-absorbing medium 32 including a first doped region 40 that serves as a field source for the electrical field to be formed in the ridge 22. The first doped region 40 can be continuous and unbroken and can be included both the ridge 22 and in the slab region as is evident from FIG. 1B. In particular, the first doped region 40 can be included both in a lateral side of the ridge 22 and in the slab region. The light-absorbing medium 32 or the absorption layer 30 can also include an undoped region between the multiplication layer and the second doped region 41.

As is evident in FIG. 1B, the portion of the slab region that includes the first doped region 40 can also include or consist of the light-absorbing medium 32. As a result, the first doped region 40 can formed in a single continuous medium. As an example the first doped region 40 can be formed in germanium that is included both in the ridge 22 and in the slab region. As is evident from FIG. 1B, the first doped region 40 can extend up to the top side of the light-absorbing medium 32. The first doped regions 40 can be an N-type doped region or a P-type doped region.

The multiplication layer 36 can include a second doped region 41 that serves as a field source for the electrical field to be formed in the ridge 22. The second doped region 41 can be continuous and unbroken and can be included both the ridge 22 and in the slab region as is evident from FIG. 1B. In particular, the second doped region 41 can be included both in a lateral side of the ridge 22 and in the slab region. As is evident in FIG. 1B, the portion of the slab region that includes the second doped region 41 can also include or consist of the same material as the multiplication layer 36. As a result, the second doped region 41 can formed in a single continuous medium. As an example the second doped region 41 can be formed in silicon that is included both in the ridge 22 and in the slab region. As is evident from FIG. 1B, the second doped region 41 can extend up to the top side of the light-absorbing medium 32. The second doped regions 41 can be N-type doped regions or a P-type doped regions.

An N-type doped region can include an N-type dopant. A P-type doped region can include a P-type dopant. Suitable dopants for N-type regions include, but are not limited to, phosphorus and/or arsenic. Suitable dopants for P-type regions include, but are not limited to, boron. The first doped region 40 and the second doped region 41 can be doped so as to be electrically conducting. A suitable concentration for the P-type dopant in a P-type doped region that serves as the first doped region 40 or the second doped region 41 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region that serves as the first doped region 40 or the second doped region 41 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$.

As noted above, a region of the multiplication layer 36 can be an N-type doped region or a P-type doped region that serves as the charge layer 35. Suitable dopants for N-type regions include, but are not limited to, phosphorus and/or arsenic. Suitable dopants for P-type regions include, but are not limited to, boron. Since the doped region 37 serves as the charge region, that doped region 37 can have a lower concentration of dopant than the first doped region 40 and/or the second doped region 41. For instance, a suitable concentration for the P-type dopant in a doped region 37 that serves as the charge layer 35 includes, but is not limited to, concentrations greater than $1 \times 10^{14}$ cm$^{-3}$, $1 \times 10^{16}$ cm$^{-3}$, or $1 \times 10^{18}$ cm$^{-3}$, and/or less than $1 \times 10^{16}$ cm$^{-3}$, $1 \times 10^{18}$ cm$^{-3}$, or $1 \times 10^{20}$ cm$^{-3}$. A suitable concentration for the N-type dopant in a doped region 37 that serves as the charge layer 35 includes, but is not limited to, concentrations greater than $1 \times 10^{14}$ cm$^{-3}$, $1 \times 10^{16}$ cm$^{-3}$, or $1 \times 10^{18}$ cm$^{-3}$, and/or less than $1 \times 10^{16}$ cm$^{-3}$, $1 \times 10^{18}$ cm$^{-3}$, or $1 \times 10^{20}$ cm$^{-3}$.

In one example, the multiplication layer 36 includes or consists of silicon, the light-absorbing material includes or consists of Germanium, the first doped region 40 is an p-type region with a dopant concentration of about $1 \times 10^{20}$ cm$^{-3}$, the second doped region 41 is an n-type region with a dopant concentration of about $1 \times 10^{20}$ cm$^{-3}$, and the second doped region 41 that serves as the charge region is a p-type region with a dopant concentration of about $1 \times 10^{17}$ cm$^{-3}$.

The first doped region 40 and the second doped region 41 are each in contact with an electrical conductor 44 such as a metal. Accordingly, the first doped region 40 provides electrical communication between one of the electrical conductors 44 and the light-absorbing medium 32. In particular, the first doped region 40 provides electrical communication between an electrical conductor 44 and the light-absorbing medium 32 included in a lateral side of the ridge 22. The second doped region 41 provides electrical communication between one of the electrical conductors 44 and the multiplication layer 36. In particular, the second doped region 41 provides electrical communication between one of the electrical conductors 44 and the portion of the multiplication layer 36 at the lateral side of the ridge 22.

During operation of the light sensor, electronics (not shown) in electrical communication with the electrical contacts are used to apply a reverse bias between the first doped region 40 and the second doped region 41. When the first doped region 40 is a p-type region, the second doped region 41 is an n-type region, and the second doped region 41 that serves as the charge region is a p-type region, a positive charge develops at the charge layer 35. As a result, there is an increased electrical field at the charge layer 35. When a photon is absorbed in the undoped region of the absorption layer, a hole and electron pair are generated. The electron is pulled toward the positive charge at the charge layer 35. The increased electrical field at the charge later causes excites the electron and causes the electron to accelerate. The electron can accelerate to the extent that interaction of the electron with the lattice structure of the multiplication layer 36 excites additional hole and electron pairs. In turn, these electrons may excite further hole and electron pairs. In this way, a single photon results in the creation of multiple electrons. These electrons provide electrical current through the light sensor. The current level can be detected and/or measured by the electronics in order to determine the presence and/or intensity of the light signal. As a result, the creation of these additional electrons from a single photon increases the sensitivity of the light sensor.

As is evident from the above discussion, there is an interface between the light-transmitting medium and the light-absorbing medium. For instance, when the charge layer 35 is a doped region of the light-transmitting medium, the contact between the charge layer 35 and the absorption layer 30 as evident in FIG. 1B causes contact between the light-transmitting medium and the light-absorbing medium. Accordingly, an interface between the light-transmitting medium and the light-absorbing medium results from the contact between the charge layer 35 and the absorption layer 30. Defects at this interface are a source of dark current in the light sensor.

The light sensor can be configured to apply an electric field to the light-absorbing medium 32 that is substantially parallel to the base 20. For instance, the light-absorbing medium 32 can include lateral sides 35 that connect a bottom side 36 and a top side 37. The bottom side is located between the top side and the base 20. In some instances, the lateral sides are substantially perpendicular relative to the base 20.

As noted above, the light sensor is suitable for use with waveguide dimensions that are suitable for use in communications applications. Accordingly, a suitable height for the waveguide 16 (labeled h in FIG. 1C) includes, but is not limited to, heights greater than 1 μm, 2 μm, and 3 μm. A suitable width for the waveguide 16 (labeled w in FIG. 1C) includes, but is not limited to, widths greater than 0.5 μm, 2 μm, and 3 μm. Suitable waveguide dimension ratios (width of the waveguide 16:height of the waveguide 16) include, but are not limited to, ratios greater than 0.15:1, 0.5:1, and 1:1 and/or less than that 0.25:1, 1:1, and 2:1. A suitable thickness for the slab regions adjacent to the waveguide includes, but is not limited to, a thickness greater than 0.1 μm, 1 μm, or 2 μm and/or less than 3 μm, 2 μm, or 1 μm.

In the light sensor, a suitable height for the ridge 22 (labeled H in FIG. 1B) includes, but is not limited to, heights greater than 0.2 μm, 2 μm, or 3 μm and/or less than 4 μm, 2 μm, or 1 μm. A suitable height for the light-absorbing medium 32 (labeled h in FIG. 1B) includes, but is not limited to, heights greater than 0.2 μm, 2 μm, or 3 μm and/or less than 4 μm, 2 μm, or 1 μm. As is evident in FIG. 1B, the slab region that includes the light-absorbing medium 32 can have a thickness that is different from the thickness of the slab region that excludes the light-absorbing medium 32. A suitable thickness for the slab region that includes the light-absorbing medium 32 includes, but is not limited to, a thickness greater than 0.1 μm, 1 μm, or 2 μm and/or less than 3 μm, 2 μm, or 1 μm. A suitable thickness for the slab region that excludes the light-absorbing medium 32 includes, but is not limited to, a thickness greater than 0.1 μm, 1 μm, or 2 μM and/or less than 3 μm, 2 μm, or 1 μm.

The width of the light-absorbing medium 32 included in the ridge 22 of the light sensor can affect the performance of the light sensor. For instance, increasing the width of the light-absorbing medium 32 can increase the portion of the light-absorbing medium 32 that receives the light signals from the waveguide 16 and can accordingly increase the efficiency of the light sensor. However, increasing this width can reduce the speed of the light sensor by increasing the distance that the electrons generated in the light-absorbing medium 32 travel through the light-absorbing medium 32. Similarly, the width of the multiplication region can slow light sensor. As a result, it is desirable for the width of the multiplication region to be less than the width of the light-absorbing region. A suitable width ratio (width of the light-absorbing medium 32:width of the multiplication layer 36) includes widths ratios greater than 0.1:1, 0.5:1, or 1:1 and/or less than 0.2:1, 1:1, or 2:1. A suitable width for the light-absorbing medium 32 includes widths greater than 0.1 μm, 1 μm, or 2 μm and/or less than 0.2 μm, 2 μm, or 4 μm. The width and implant concentration of the charge layer can play a role in performance of the light sensor. For instance, the width and implant concentration of the charge layer can affect the electrical field distribution in the absorption layer and multiplication layer. In some instances, the width of the charge layer is greater than 0.1 um and/or less than 0.2 um. Additionally or alternately, in some instances, the doping concentration in the charge layer is greater than $1 \times 10^{17}$ cm$^{-3}$ and/or less than $5 \times 10^{17}$ cm$^{-3}$.

In one example of the light sensor, the height for the ridge 22 is 3 μm, the height for the light-absorbing medium 32 is 2 μm, the slab region that includes the light-absorbing medium 32 is 1 μm, and the thickness of the slab region that excludes the light-absorbing medium 32 is 1 μm. In this example, the width of the multiplication region is 0.5 μm and the width of the light-absorbing region is 1.5 μm.

Rather than using first doped region 40 and the second doped region 41 as the field sources, electrical conductors 44 such as metal can be used as the field sources. For instance, the first doped region 40 and the second doped region 41 need not be formed and electrical conductors can be formed over the locations of the first doped region 40 and the second doped region 41. The electrical conductors can then serve as the field sources.

Figure 2:
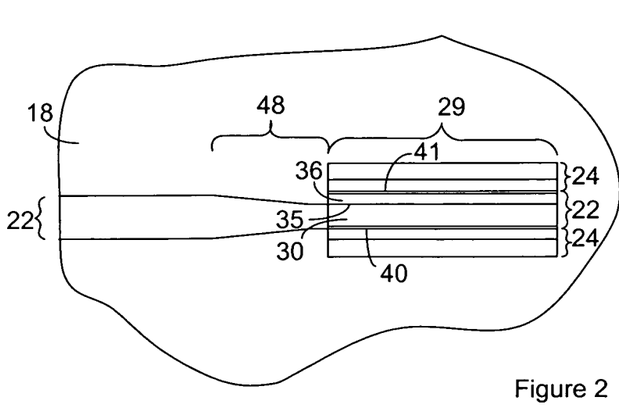
FIG. 2 is a topview of an optical device where the waveguide includes a horizontal taper.

FIG. 2 is a topview of an optical device where the waveguide 16 includes a taper 48. The taper 48 can be a horizontal taper and need not include a vertical taper although a vertical taper is an option. The taper 48 is positioned before the light sensor. For instance, the horizontal taper occurs in the light-transmitting medium 18 rather than in the light-absorbing medium 32. The taper 48 allows the light-absorbing medium 32 to have a narrower width than the waveguide 16. The reduced width of the light-absorbing medium 32 increases the speed of the light sensor. The optical component preferably excludes additional components between the taper and light sensor although other components may be present.

The optical device can be constructed using fabrication technologies that are employed in the fabrication of integrated circuits, optoelectronic circuits, and/or optical devices. For instance, the ridge 22 for the waveguide 16 and/or the seed portion 34 can be formed in the light-transmitting medium 18 using etching technologies on a silicon-on-insulator wafer. Horizontal tapers can be readily formed using masking and etching technologies. Suitable methods for forming vertical tapers are disclosed in U.S. patent application Ser. No. 10/345,709, filed on Jan. 15, 2003, entitled "Controlled Selectivity Etch for Use with Optical Component Fabrication," and incorporated herein in its entirety.

FIG. 3A through FIG. 8 illustrate a method of generating an optical device constructed according to FIG. 1A through FIG. 1C. The method is illustrated using a silicon-on-insulator wafer or chip as the starting precursor for the optical device. However, the method can be adapted to platforms other than the silicon-on-insulator platform.

Figure 3A:
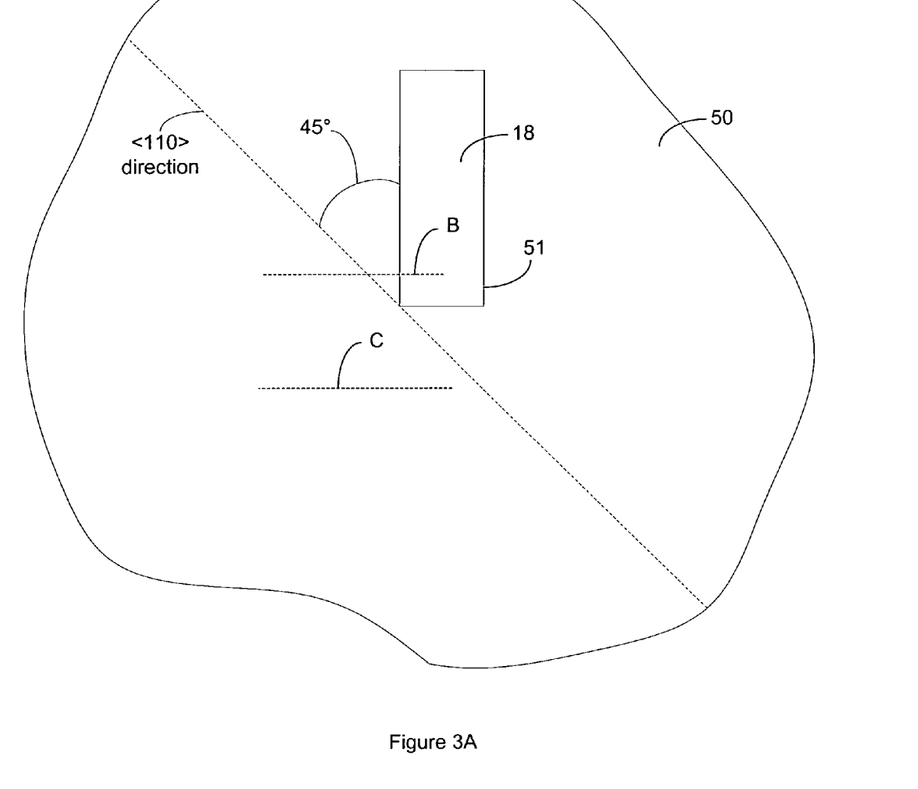
Figure 3B:
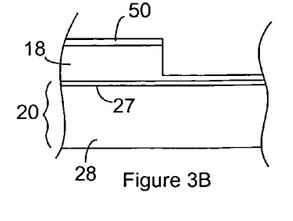
Figure 3C:
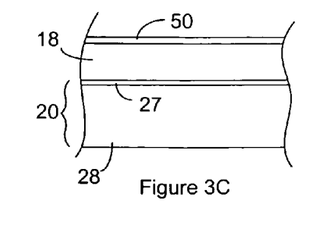

FIG. 3A through FIG. 3C illustrate a first mask 50 formed on the silicon-on-insulator wafer or chip to provide a device precursor. FIG. 3A is a topview of the device precursor. FIG. 3B is a cross-section of the device precursor shown in FIG. 3A taken along the line labeled B. FIG. 3C is a cross-section of the device precursor shown in FIG. 3A taken along the line labeled C. The first mask 50 includes one or more sides that define an opening 51 that leaves exposed a region of the device precursor where a sensor cavity is to be formed while the remainder of the illustrated portion of the device precursor is protected. The sensor cavity is the region of the device precursor where the light-absorbing medium 32 and the slab region that includes the light-absorbing medium 32 are to be formed.

A first etch is then performed so as to form the sensor cavity. The first etch yields the device precursor of FIG. 3A through FIG. 3C. The first etch is performed such that the seed portion 34 of the light-transmitting medium 18 remains on the base 20. Accordingly, the first etch can optionally be terminated before the base 20 is reached.

The first etch is a wet etch. When the light-transmitting medium 18 is a crystalline material such as silicon, wet etches generally produce a recess that has a pyramid shape. However, this effect can be overcome by providing the first mask with a particular orientation relative to the crystal lattice. For instance, a silicon-on-insulator wafer is generally constructed so the major cut is along the <110> direction and the (100) plane is parallel to the upper surface of the light-transmitting medium 18.

The line labeled "<110> direction" in FIG. 3A shows the location of the <110> direction in the crystal structure of the light-transmitting medium. At least one of the one or more sides of the first mask is at a 45° angle relative to the <110> direction of the crystalline light-transmitting medium. In the embodiment shown in FIG. 3A, since the opening has a rectangular or square shape, each sides that defines the opening is at a 45° angle relative to the <110> direction of the crystalline light-transmitting medium. The sides can have some height or thickness. Accordingly, a side that is at a 45° angle relative to the <110> direction preferably has the entire plane of the side at 45° angle relative to the <110> direction. For instance, the side can be substantially perpendicular relative to the base. However, other arrangements are possible. For instance, a side that is at a 45° angle relative to the <110> direction can have only a portion of the side at a 45° angle relative to the <110> direction. In one example, a side that is at a 45° angle relative to the <110> direction can has only the portion of the first mask contacting the wafer at a 45° angle relative to the <110> direction and the remainder of the side can taper away from the opening.

During the wet etch, the sides of the first mask that are at a 45° angle relative to the <110> direction provide surfaces of (100) planes that are each 45° from the <110> direction and also perpendicular or substantially perpendicular to the base (as shown in FIG. 3B). As will become evident from the remainder of the fabrication method, one or more of the (100) plane surfaces that are each 45° from the <110> direction become part of the lights sensor. As a result, in some instances, the orientation of the light sensor on the wafer can be limited. Since the waveguides can be curved to carry light signals to a light sensors having a variety of different orientations on the wafer, this feature is not believed to be particularly limiting.

As discussed above, the edges of the opening in the first mask can be formed at a 45° angle relative to the <110> direction. The <110> direction can be determined from the wafer flat. For instance, a silicon-on-insulator wafer generally has a round perimeter but with a portion of that perimeter being flat. This flat portion is called the "wafer flat" and the orientation of the crystal planes relative to this wafer flat is known. As a result, the <110> direction can be determined from the wafer flat. After this direction is determined, the first mask can be formed with one or more edges that are each at a 45° angle relative to the <110> direction. A suitable first mask 50 includes, but is not limited to, a photoresist and/or hard mask such as silicon dioxide and silicon nitride.

Wet etches are etches that employ one or more liquid phase etchants rather than the gaseous and/or plasma phase etchants used in dry etching processes. The chip can be immersed in the liquid etchant or technologies for exposing only a portion of the chip sides to the one or more etchants can be used. In some instance, the wet etch is selective for the (100) plane over the (111) plane.

When the chip is a silicon-on-insulator wafer, particular examples of suitable etchants for use in the wet etch include, but are not limited to, KOH, TMAH, and EDF. In one example, the chip is a silicon-on-insulator wafer, the etchant is TMAH, and the chip is immersed in the etchant. This etchant is 35 times more selective for the (100) plane over the (111) plane.

Figure 4A:
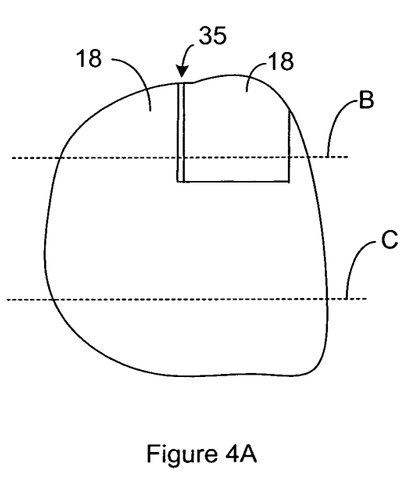
Figure 4B:
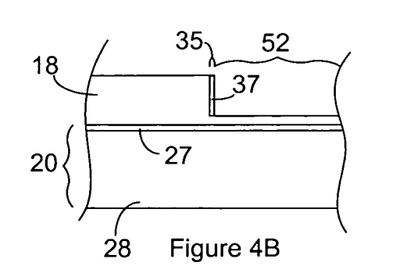
Figure 4C:
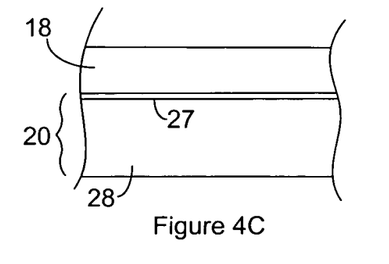

As shown in FIG. 4A through FIG. 4C, the charge layer is formed in the sensor cavity 52 of FIG. 3A through FIG. 3C. FIG. 4A is a topview of the device precursor. FIG. 4B is a cross-section of the device precursor shown in FIG. 3A taken along the line labeled B. FIG. 4C is a cross-section of the device precursor shown in FIG. 3A taken along the line labeled C. The charge layer can be formed by forming the doped region 37 in a vertical wall of the light-transmitting medium 18. The doped region 37 can be generated by forming a doping mask on the device precursor so the locations of the doped region 37 remains exposed and the remainder of the illustrated portion of the device precursor is protected. High angle dopant implant processes can be employed to form the doped region 37. The doping mask can then be removed.

Figure 5A:
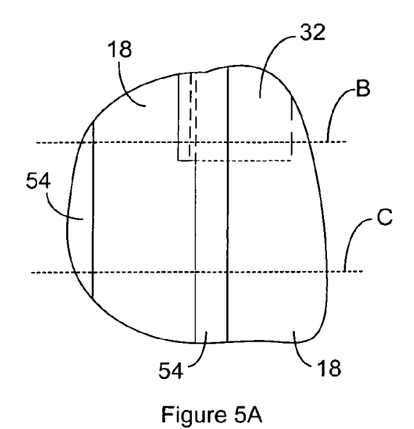
Figure 5B:
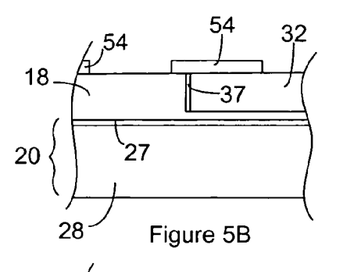
Figure 5C:
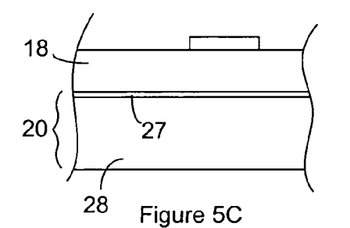

As shown in FIG. 5A through FIG. 5C, the light-absorbing medium 32 is formed in the sensor cavity of FIG. 4A through FIG. 4C. FIG. 5A is a topview of the device precursor. FIG. 5B is a cross-section of the device precursor shown in FIG. 5A taken along the line labeled B. FIG. 5C is a cross-section of the device precursor shown in FIG. 5A taken along the line labeled C. When the light-transmitting medium 18 is silicon and the light-absorbing medium 32 is germanium, the germanium can be grown on the seed portion 34 of the silicon. When the light-absorbing medium 32 is germanium, a suitable method for growing the light-absorbing medium 32 includes, but is not limited to, epitaxial (EPI) growth processes. Suitable methods for performing the epitaxial (EPI) growth processes are discussed below in conjunction with FIG. 9A through FIG. 9E. As is evident in FIG. 5B, this growth of the light-absorbing medium 32 produces the interface that is the source of dark current in the light sensor. The use of a wet etch as the first etch improves the quality of this interface by reducing the presence of defects. The reduction in defects reduces the presence of dark current.

Since the portion of the interface defined by the light-transmitting medium 18 is at a 45° angle relative to the <110> direction of a crystalline light-transmitting medium, the interface is also at a 45° angle relative to the <110> direction of a crystalline light-transmitting medium. Additionally, since the portion of the interface defined by the light-transmitting medium 18 is substantially perpendicular relative to the base, the interface is also substantially perpendicular relative to the base.

After formation of the light light-absorbing medium 32, the device precursor can be planarized to provide the device precursor of FIG. 5A through FIG. 5C. An example of a suitable planarization method is a chemical-mechanical polishing (CMP) process.

After planarization of the device precursor, a second mask can be formed on the device precursor as shown in FIG. 5A through FIG. 5C. The second mask 54 is formed such that the regions where the slab regions are to be formed remain exposed while protecting the remainder of the illustrated portion of the device precursor. A suitable second mask 54 includes a hard mask such as a silica mask.

Figure 6A:
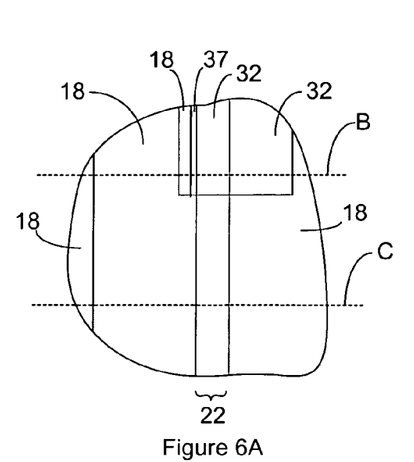
Figure 6B:
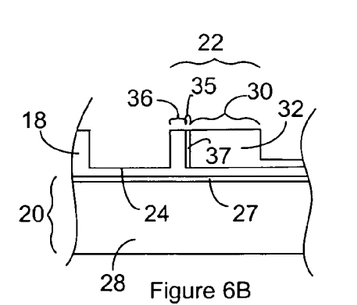
Figure 6C:
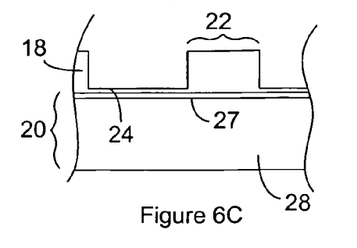

A second etch is performed on the device precursor of FIG. 5A through FIG. 5C to provide the device precursor of FIG. 6A through FIG. 6C. FIG. 6A is a topview of the device precursor. FIG. 6B is a cross-section of the device precursor shown in FIG. 6A taken along the line labeled B. FIG. 6C is a cross-section of the device precursor shown in FIG. 6A taken along the line labeled C. The second etch is stopped when the slab region that excludes the light-absorbing medium 32 is formed to the desired thickness. Since the second etch etches the light-transmitting medium 18 and the light-absorbing medium 32 concurrently, the second etch may etch the light-transmitting medium 18 and the light-absorbing medium 32 to different depths. As a result, FIG. 7B (and also FIG. 2B) illustrates the slab region that includes the light-absorbing medium 32 being formed to a different thickness than the slab region that excludes the light-absorbing medium 32. In one example, the second etch is selected to etch the light-transmitting medium 18 more slowly than the light-absorbing medium 32. As a result, in some instances, a third etch is optionally performed to achieve the desired thickness of light-transmitting medium 18 adjacent to the ridge and/or to achieve the desired thickness of light-absorbing medium 32 adjacent to the ridge.

Figure 7A:
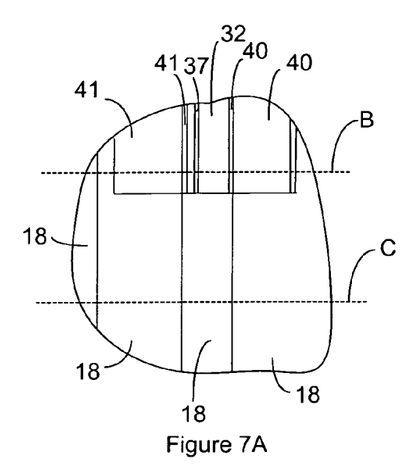
Figure 7B:
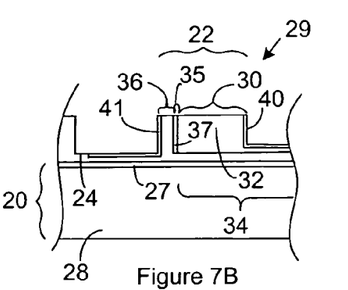
Figure 7C:
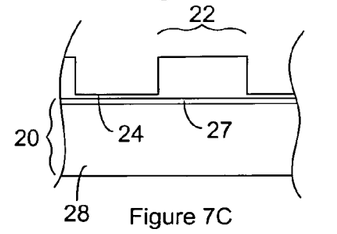

The first doped region 40 and the second doped region 41 can be formed in the device precursor of FIG. 6A through FIG. 6C to provide the device precursor of FIG. 7A through FIG. 7C. FIG. 7A is a topview of the device precursor. FIG. 7B is a cross-section of the device precursor shown in FIG. 7A taken along the line labeled B. FIG. 7C is a cross-section of the device precursor shown in FIG. 7A taken along the line labeled C. The first doped regions 40 can be generated by forming a doping mask on the device precursor so the location of the first doped regions 40 remain exposed and the remainder of the illustrated portion of the device precursor is protected. High angle dopant implant processes can be employed to form the first doped regions 40. The doping mask can then be removed. The same sequence can then be employed to form the second doped region 41. The second doped region 41 can be formed before the first doped region 40 or the first doped region 40 can be formed before the second doped region 41.

Figure 8:
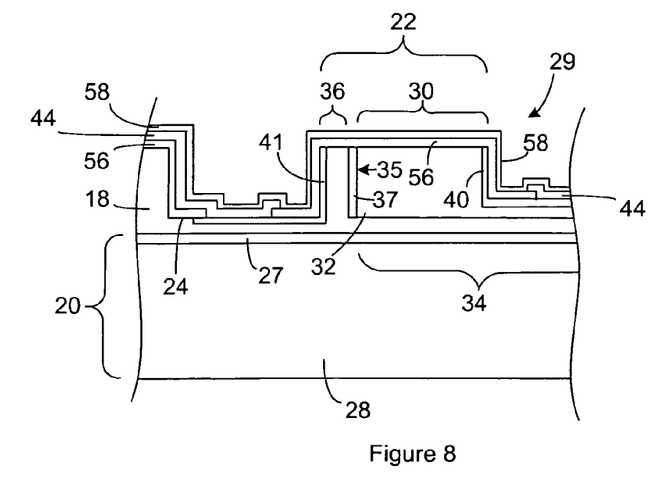

A first cladding 56, metal conductors 44, and a second cladding 58 can optionally be formed on the device precursor of FIG. 7A through FIG. 7C to provide the device precursor of FIG. 8. The first cladding can be formed such that the portion of the first doped region 40 and the second doped region 41 that is to be contacted by the electrical conductors 44 remain exposed and the remainder of the illustrated portion of the device precursor are protected by the first cladding. A suitable first cladding includes, but is not limited to, PECVD deposited silica that is subsequently patterned using photolithography. The electrical conductors 44 can be formed on the resulting device precursor. The electrical conductors 44 can be formed so each electrical conductor 44 extends from the first doped region 40 or the second doped region 41, out of the trench 24, and over the light-transmitting medium 18. Suitable electrical conductors 44 include metals such as titanium and aluminum. The metals can be deposited by sputtering and patterned by photolithography. A second cladding can optionally be formed on the resulting device precursor. The second cladding can be patterned such that the second cladding defines contact pads on the electrical conductors 44. Since the contact pads can be positioned outside of the trenches 24, the location of the contact pads is not illustrated in FIG. 8. A suitable second cladding includes, but is not limited to, PECVD deposited SiN that is subsequently patterned using photolithography.

The device can be used in conjunction with electronics that are in electrical communication with the portion of the electrical conductors 44 that act as contact pads. The electronics can apply electrical energy to the contact pads so as to form a reverse bias across the light sensor.

Figure 9A:
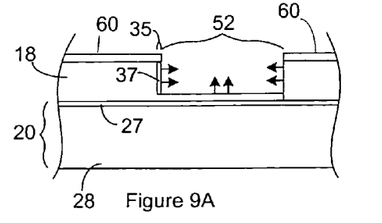

As discussed above in conjunction with FIG. 5A through FIG. 5C, the light-absorbing medium 32 is formed in the sensor cavity. The light-absorbing medium 32 can be grown in the sensor cavity. FIG. 9A through FIG. 9E illustrate different methods for growing the light-absorbing medium 32. For instance, a growth mask 60 can be formed on the wafer as shown in FIG. 9A. A suitable growth mask 60 includes, but is not limited to, a hard mask such as silicon dioxide and silicon nitride.

Figure 9B:
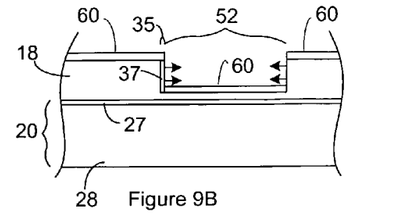
Figure 9C:
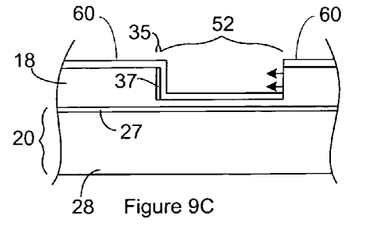

The growth mask 60 protects the underlying wafer from growth of the light-absorbing medium 32 during a growth process such as epitaxial growth. As a result, the arrows shown in FIG. 9A illustrate the directions of growth of the light-absorbing medium 32. Accordingly, in FIG. 9A, the light-absorbing medium 32 grows from the bottom and sides of the sensor cavity. As shown in FIG. 9B, the growth mask 60 can also be formed in the bottom of the sensor cavity. As a result, the light-absorbing medium 32 grows from the sides of the sensor cavity as shown by the arrows in FIG. 9B. As shown in FIG. 9C, the growth mask 60 can be formed in the bottom of the sensor cavity and also on a portion of the sides of the sensor cavity. As a result, the light-absorbing medium 32 grows from the unprotected side(s) of the sensor cavity as shown by the arrows in FIG. 9C. As evident from FIG. 9C, the growth mask 60 can be formed so the light-absorbing medium 32 grows in a direction that is away from the interface or is toward the interface until that growth brings the light-absorbing medium 32 into contact with the doped region 37 and accordingly forms the interface. As is evident from FIG. 9C, the presence of the growth mask 60 on the bottom of the sensor cavity stops or reduces growth from the bottom of the sensor cavity during the growth of the light-absorbing medium 32 toward or away form the light-absorbing medium 32.

Figure 9D:
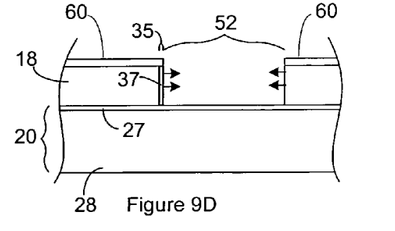
Figure 9E:
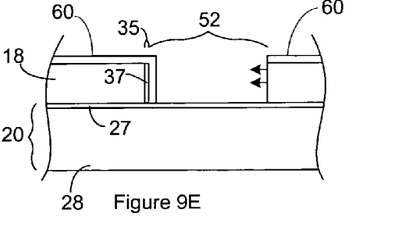

The optical insulator 27 can also serve as the growth mask 60. For instance, the sensor cavity can be formed down to the level of the optical insulator as shown in FIG. 9D and FIG. 9E. Accordingly, the growth mask 60 can be formed so the sides of the sensor cavity are unprotected as shown in FIG. 9D. During the growth of the light-absorbing medium 32, the optical insulator 27 acts as a growth mask 60 on the bottom of the sensor cavity. As a result, the light-absorbing medium 32 grows from the sides of the sensor cavity as shown by the arrows in FIG. 9D. Alternately, the growth mask 60 can be formed so a portion of the sides of the sensor cavity are unprotected as shown in FIG. 9E. During the growth of the light-absorbing medium 32, the optical insulator 27 acts as a growth mask 60 on the bottom of the sensor cavity. As a result, the light-absorbing medium 32 grows from the unprotected sides of the sensor cavity as shown by the arrows in FIG. 9E. As evident from FIG. 9E, the growth mask 60 can be formed so the light-absorbing medium 32 grows in a direction that is toward the interface or away from the interface with little or no growth from the bottom of the sensor cavity.

The growth methods shown in FIG. 9A through FIG. 9E can be selected to achieve the highest quality interface. For instance, a method where light-absorbing medium 32 grows toward the interface until that growth brings the light-absorbing medium 32 into contact with the interface may provide a higher quality interface than other growth methods.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a waveguide on a base, the waveguide configured to guide a light signal through a crystalline light-transmitting medium;
a light sensor positioned on the base,
the light sensor including a charge layer between a multiplication layer and an absorption layer,
the absorption layer positioned to receive at least a portion of the light signal from the waveguide,
the absorption layer configured to generate a hole and electron pair in response to receiving a photon of the light signal, and
the multiplication layer positioned to receive the electron generated in the absorption layer and being configured to generate additional electrons in response to receiving the electron; and
the absorption layer including a light-absorbing medium that contacts the light transmitting medium at an interface, the interface being at a 45° angle relative to a <110> direction of the light-transmitting medium.

2. The device of claim 1, wherein the interface is perpendicular to the base.

3. A method of forming an optical device, comprising:
providing a wafer having a crystalline light-transmitting medium on a base;
forming a waveguide and a sensor on the wafer such that the sensor is positioned to receive a light signal from the waveguide,
the sensor having an interface where two different materials contact one another, the interface being at a 45° angle relative to a <110> direction of the light-transmitting medium.

4. The method of claim 3, wherein the interface is perpendicular to the base.

5. The method of claim 3, wherein forming the sensor includes performing a wet etch of the light-transmitting medium.

6. The method of claim 3, wherein the interface is a location where the light-transmitting medium contacts a light-absorbing medium.

7. The method of claim 6, wherein the light-transmitting medium is silicon and the light-absorbing medium includes germanium.

8. The method of claim 3, wherein forming the sensor includes performing a wet etch of the light-transmitting medium while a mask protects a portion of the wafer, the mask having one or more edges that define an unprotected region of the wafer and are each at a 45° angle relative to a <110> direction of the light-transmitting medium.

9. The method of claim 8, wherein forming the sensor includes wet etching the wafer with the mask in place on the wafer.

10. The method of claim 9, wherein the wet etch forms a sensor cavity in the light-transmitting medium, a side of the sensor cavity including a surface of the light-transmitting medium that is perpendicular to the base and is at a 45° angle relative to a <110> direction of the light-transmitting medium.

11. The method of claim 10, wherein the side of the sensor cavity is formed by the wet etch.

12. The method of claim 11, wherein forming the sensor includes performing an epitaxial growth of a light-absorbing medium in a least a portion of the sensor cavity.

13. The method of claim 12, where forming the sensor includes forming a doped region in a portion of the light-transmitting medium that includes the side, the doped region being formed before performing the epitaxial growth.

14. The method of claim 13, wherein sensor includes a charge region between a multiplication layer and an absorption layer, the doped region being included in the charge layer.

15. The device of claim 1, wherein the light-transmitting medium is silicon and the light-absorbing medium includes germanium.

16. The device of claim 1, wherein the light sensor includes a ridge extending from slab regions positioned on opposing sides of the ridge, the ridge includes the charge layer, the multiplication layer and the absorption layer.

17. The device of claim 16, wherein the multiplication layer contacts the base.

18. The device of claim 16, wherein none of the absorption layer is between the base and the multiplication layer.

19. The device of claim 16, wherein a region of the light-transmitting medium that is included in both the ridge and one of the slab region is doped so as to be electrically conducting.

20. The device of claim 16, wherein a region of the light-absorbing medium that is included in both the ridge and one of the slab region is doped so as to be electrically conducting.

* * * * *